United States Patent [19]
Fujimaki

[11] Patent Number: 5,721,058
[45] Date of Patent: Feb. 24, 1998

[54] SENSOR MARK TRANSFER RIBBON AND METHOD OF TRANSFERRING SENSOR MARK

[75] Inventor: Satoshi Fujimaki, Tochigi, Japan

[73] Assignee: Sony Chemicals Corporation, Tokyo, Japan

[21] Appl. No.: 856,346

[22] Filed: May 14, 1997

Related U.S. Application Data

[63] Continuation of Ser. No. 275,375, Jul. 15, 1994, abandoned.

[30] Foreign Application Priority Data

Jul. 20, 1993  [JP]  Japan ..................... 5-179187

[51] Int. Cl.$^6$ .................. B23B 9/04; B41M 5/025; B44C 1/17; C09D 11/12
[52] U.S. Cl. .............. 428/484; 428/488.1; 428/914; 156/234; 156/238; 106/31.29; 106/31.31; 106/31.9
[58] Field of Search ................. 156/234, 235, 156/238; 106/31.13, 31.29, 31.31, 31.4; 428/206, 207, 484, 488.1, 914

[56] References Cited

U.S. PATENT DOCUMENTS

| | | | |
|---|---|---|---|
| 4,777,079 | 10/1988 | Nagamoto et al. | 428/212 |
| 5,106,676 | 4/1992 | Sato et al. | 428/212 |
| 5,332,459 | 7/1994 | Imai et al. | 156/234 |

Primary Examiner—David A. Simmons
Assistant Examiner—J. A. Lorengo
Attorney, Agent, or Firm—Hill, Steadman & Simpson

[57] ABSTRACT

A sensor mark transfer ribbon has a base and a thermally meltable ink disposed on said base, said thermally meltable ink being composed of a thermally meltable material and a coloring material. The thermally meltable ink has a melting point ranging from 65° C. to 75° C. and a melting viscosity of at most 16 cst.

5 Claims, 3 Drawing Sheets

FIG. 2

| | 1. Transferred State of Sensor Mark | 2. Blocking Resistance of Sensor Mark | 3. Detection of Sensor Mark | 4. Print Quality of Sensor Mark Transferred Portion | Binder Wax Names | Boiling Point (°C) | Melting Viscosity (cst)/100°C |
|---|---|---|---|---|---|---|---|
| Inventive Example 1 | ○ | ○ | ○ | ○ | HNP-3 (Paraffin Wax) | 65 | 5 |
| 2 | ○ | ○ | ○ | ○ | HNP-12 (Paraffin Wax) | 67 | 7 |
| 3 | ○ | ○ | ○ | ○ | HNP-10 (Paraffin Wax) | 75 | 8 |
| 4 | ○ | ○ | ○ | ○ | Hi-Mic 2065 (Micro-Wax) | 75 | 8 |
| Inventive Example 5 | ○ | ○ | ○ | ○ | LANOX KH-75 (Lanolin Wax) | 75 | 16 |
| Comparative Example 1 | ○ | × | ○ | ○ | 135°F (Paraffin Wax) | 58 | 4 |
| 2 | × | ○ | ○ | × | CARNAUBA WAX | 85 | 27 |
| 3 | × | ○ | ○ | × | Hi-Mic 3039 (Micro-Wax) | 88 | 17 |
| 4 | × | ○ | ○ | × | LANOX FP-8N (Lanolin Wax) | 71 | 65 |
| Comparative Example 5 | × | ○ | ○ | × | LANOX FP-1410N (Lanolin Wax) | 68 | 1600 |

SENSOR MARK TRANSFER RIBBON AND METHOD OF TRANSFERRING SENSOR MARK

This is continuation of application Ser. No. 08/275,375, filed Jul. 15, 1994, now abandoned.

BACKGROUND OF THE INVENTION

The present invention relates to a sensor mark transfer ribbon for use in a thermal transfer printer which employs a thermal head, and a method of transferring a sensor mark from a sensor mark transfer ribbon to a thermal transfer ribbon.

Thermal transfer ribbons for use in thermal transfer printers with thermal heads are often required to have an optically detectable sensor mark at a certain position thereon for detecting the end of the ribbon or aligning the thermal transfer ribbon with a printing position. It has been customary to mark a thermal transfer ribbon with an optically detectable sensor mark according to either a printing or transfer process.

One conventional printing process for marking a thermal transfer ribbon with an optically detectable sensor mark will be described below with reference to FIG. 1 of the accompanying drawings. As shown in FIG. 1, a sensor mark ink 20 is stored in an ink adjusting device 22 and adjusted to a constant condition by an agitator 21. The sensor mark ink 20 is supplied to an ink base 26 of a printing device 25 by an ink circulating device 24 having a pump 23 as a drive source. The sensor mark ink 20 applied to the surface of a print roller 27a is printed on one surface of a thermal transfer ribbon 29 which is held in sliding contact with a grip roller 27b that is movable back and forth by an actuator 28 such as a solenoid or the like. The sensor mark ink 20 applied to the thermal transfer ribbon 29 is then dried at a temperature of about 120° C. in a drying device 33 through which air is caused to flow from an air inlet 30 to an air outlet 32 by an air discharging device 31. Generally, the drying device 33 for drying the printed thermal transfer ribbon 29 is complex in structure and cannot easily accommodate various configurations of thermal transfer ribbon.

According to a conventional sensor mark transfer process, a transfer film for forming a sensor mark is heated to transfer a sensor mark to a thermal transfer ribbon. When a sensor mark is formed on a surface of the thermal transfer ribbon opposite to its ink surface, i.e., a surface of the thermal transfer ribbon which is held in contact with a thermal head, the formed sensor mark is melted by the heat of the thermal head and applied to the surface of the thermal head.

SUMMARY OF THE INVENTION

It is therefore an object of the present invention to provide a sensor mark transfer ribbon for forming a sensor mark on an ink surface of a thermal transfer ribbon without adversely affecting a thermal head, and a method of transferring a sensor mark from a sensor mark transfer ribbon to a thermal transfer ribbon.

According to the present invention, there is provided a sensor mark transfer ribbon comprising a base and a thermally meltable ink disposed on the base, the thermally meltable ink being composed of a thermally meltable material and a coloring material.

The thermally meltable ink has a melting point ranging from 65° C. to 75° C. and a melting viscosity of at most 16 cst.

According to the present invention, there is also provided a method of transferring a sensor mark from a sensor mark transfer ribbon to a thermal transfer ribbon, comprising the steps of keeping an ink surface of a sensor mark transfer ribbon in a tension-free condition, pressing the ink surface of the sensor mark transfer ribbon against an ink surface of a thermal transfer ribbon, and heating the sensor mark transfer ribbon to transfer a sensor mark from the sensor mark transfer ribbon to the thermal transfer ribbon.

The method may further comprise the steps of cooling the sensor mark transfer ribbon after the sensor mark is pressed against the thermal transfer ribbon, and peeling a base of the sensor mark transfer ribbon off the sensor mark thereby to transfer the sensor mark from the sensor mark transfer ribbon to the thermal transfer ribbon.

Since the thermally meltable ink composed of a thermally meltable material and a coloring material is coated on a base, a sensor mark of thermally meltable ink can easily be transferred with heat to the thermal transfer ribbon.

The thermally meltable ink for transferring a sensor mark has a melting temperature ranging from 65° C. to 75° C., and a melting viscosity of 16 cst or less. Therefore, the sensor mark of thermally meltable ink can easily be transferred to the thermal transfer ribbon when heated.

In the method of transferring the sensor mark, the ink surface of the sensor mark transfer ribbon is kept tension-free in confronting relation to the ink surface of the thermal transfer ribbon, and then the sensor mark transfer ribbon and the thermal transfer ribbon are gripped, with their ink surfaces facing each other, between the heating roll or transfer bar and the pressing roller, during which time a sensor mark is transferred from the sensor mark transfer ribbon to the thermal transfer ribbon with heat. Consequently, the sensor mark can easily be formed on the ink surface of the thermal transfer ribbon.

After the sensor mark pressed against to the thermal transfer ribbon is cooled, the base of the sensor mark transfer ribbon is peeled off the sensor mark by peeling timing adjusting roll, and thus transferred to the thermal transfer ribbon. Therefore, the sensor mark can reliably be formed on the ink surface of the thermal transfer ribbon.

BRIEF DESCRIPTION OF THE DRAWINGS

FIG. 2 is a table showing the materials and properties of sensor mark transfer ribbons according to Inventive and Comparative Examples;

DETAILED DESCRIPTION OF THE PREFERRED EMBODIMENTS

Figure 1:
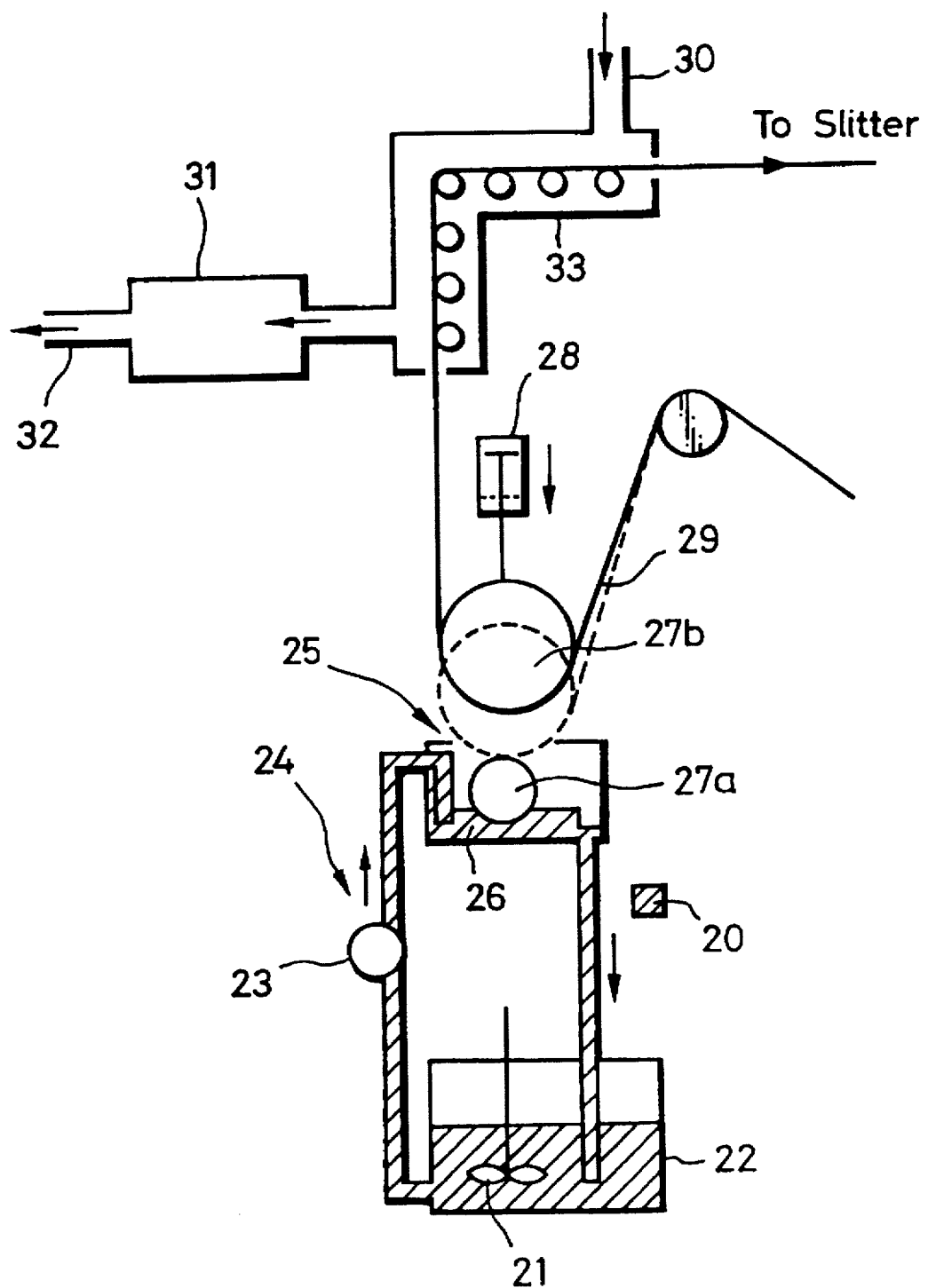
FIG. 1 is a schematic view illustrative of a conventional process of printing a sensor mark on a thermal transfer ribbon.

A sensor mark transfer ribbon according to the present invention comprises a film base and a thermal transfer ink layer disposed on one surface of the film base, the thermal transfer ink layer being composed of a wax and a coloring material. The film base comprises a plastic film such as a polyester film, a polyimide film, a polyether etherketone film, a polypropylene film, a polyethylene film, a cellophane film, a nylon film, or the like, a sheet of paper such as capacitor paper, paraffin paper, or the like, or a combination thereof.

The thermal transfer ink layer comprises either a compound coated on the film base by hot-melt coating, the compound being composed of a coloring material, a wax, a thermoplastic resin, a dispersant, a plasticizer, etc., or a coating solution coated on the film base by solvent coating, the coating solution being prepared by dispersing the above compound in a suitable solvent. The thermal transfer ink layer is required to have a thickness in the range of from 0.3 to 0.5 µm to produce good sensor marks.

The coloring material comprises fine metal powder of aluminum, silver, or the like, or an inorganic white pigment such as titanium oxide, calcium carbonate, or the like, or an organic pigment such as melamine, Teflon, silicone resin, or the like.

The wax comprises a vegetable wax such as a candelilla wax, a carnauba wax, a rice wax, or the like, or an animal wax such as a beeswax, lanolin, or the like, or a mineral wax such as montan wax, ceresin, or the like, a petroleum wax such as paraffin wax, a microcrystalline wax, or the like, or a synthetic wax such as a Fischer-Tropsch was, a polyethylene wax, or the like.

The wax should preferably have a melting point of 65° C. or higher for desired blocking resistance. The melting point of the sensor mark transfer ribbon should not be at least 5° C. higher than the melting point of the thermal transfer ribbon because if the melting point of the sensor mark transfer ribbon were too higher than the melting point of the thermal transfer ribbon, then sensor marks would not be transferred or the print quality of sensor mark transferred portions of the thermal transfer ribbon would be lowered.

If the melting viscosity of the wax were too high, then the print quality of sensor mark transferred portions of the thermal transfer ribbon would be lowered. The melting viscosity of the wax at 100° C. should preferably be 16 cst or lower. The thermoplastic resin comprises a copolymer of ethylene and vinyl acetate, a copolymer of ethylene and acrylic ester, a copolymer of vinyl chloride and vinyl acetate, a vinyl chloride resin, a polyamide resin, a polybutene resin, or a petroleum resin.

The present invention will be described in further detail below with respect to Inventive and Comparative Examples as shown in FIG. 2. Four composition solutions, described below, for forming ink layers on sensor mark transfer ribbons were prepared, coated on polyester films each having a thickness of 6 µm, thus producing sensor mark transfer ribbons each having an ink layer having a dried coating thickness of about 1 µm.

In Inventive Example 1, the composition solution was composed of 35 parts by weight of Extrafine 0240T (an aluminum paste manufactured by Toyo Aluminum K.K., effective component: 65%), 15 parts by weight of HNP-3 (a paraffin wax manufactured by Nippon Seiro Co., Ltd., m.p. 65° C., melting viscosity: 5 cst/100° C.), and 50 parts by weight of toluene.

In Inventive Example 2, the composition solution was composed of 35 parts by weight of Extrafine 0240T (an aluminum paste manufactured by Toyo Aluminum K.K., effective component: 65%), 15 parts by weight of HNP-12 (a paraffin wax manufactured by Nippon Seiro Co., Ltd., m.p. 67° C., melting viscosity: 7 cst/100° C.), and 50 parts by weight of toluene.

In Inventive Example 3, the composition solution was composed of 35 parts by weight of Extrafine 0240T (an aluminum paste manufactured by Toyo Aluminum K.K., effective component: 65%), 15 parts by weight of HNP-10 (a paraffin wax manufactured by Nippon Seiro Co., Ltd., m.p. 75° C., melting viscosity: 8 cst/100° C.), and 50 parts by weight of toluene.

In Inventive Example 4, the composition solution was composed of 35 parts by weight of Extrafine 0240T (an aluminum paste manufactured by Toyo Aluminum K.K., effective component: 65%), 10 parts by weight of HNP-10 (a paraffin wax manufactured by Nippon Seiro Co., Ltd., m.p. 75° C., melting viscosity: 8 cst/100° C.), and 50 parts by weight of toluene.

In Inventive Example 5, the composition solution was composed of 35 parts by weight of Extrafine 0240T (an aluminum paste manufactured by Toyo Aluminum K.K., effective component: 65%), 10 parts by weight of LANOX KH-75 (a lanolin wax manufactured by Yoshikawa Seiyu Co., Ltd., m.p. 75° C., melting viscosity: 16 cst/100° C.), and 50 parts by weight of toluene.

In Comparative Example 1, the composition solution was composed of 35 parts by weight of Extrafine 0240T (an aluminum paste manufactured by Toyo Aluminum K.K., effective component: 65%), 15 parts by weight of 135° F. (a paraffin wax manufactured by Nippon Seiro Co., Ltd., m.p. 58° C., melting viscosity: 4 cst/100° C.), and 50 parts by weight of toluene.

In Comparative Example 2, the composition solution was composed of 35 parts by weight of Extrafine 0240T (an aluminum paste manufactured by Toyo Aluminum K.K., effective component: 65%), 15 parts by weight of a karnauba wax (manufactured by K.K. Noda Wax, m.p. 85° C., melting viscosity: 27 cst/100° C.), and 50 parts by weight of toluene.

In Comparative Example 3, the composition solution was composed of 35 parts by weight of Extrafine 0240T (an aluminum paste manufactured by Toyo Aluminum K.K., effective component: 65%), 15 parts by weight of Hi-Mic 3090 (a microwax manufactured by Nippon Seiro Co., Ltd., m.p. 88° C., melting viscosity: 17 cst/100° C.), and 50 parts by weight of toluene.

In Comparative Example 4, the composition solution was composed of 35 parts by weight of Extrafine 0240T (an aluminum paste manufactured by Toyo Aluminum K.K., effective component: 65%), 10 parts by weight of LANOX FP-8N (a lanolin wax manufactured by Yoshikawa Seiyu Co., Ltd., m.p. 71° C., melting viscosity: 65 cst/100° C.), and 50 parts by weight of toluene.

In Comparative Example 5, the composition solution was composed of 35 parts by weight of Extrafine 0240T (an aluminum paste manufactured by Toyo Aluminum K.K., effective component: 65%), 10 parts by weight of LANOX FP-1410N (a lanolin wax manufactured by Yoshikawa Seiyu Co., Ltd., m.p. 68° C., melting viscosity: 1600 cst/100° C.), and 50 parts by weight of toluene.

Then, a protective layer of acryl-silicone resin (Simac US380 manufactured by Toagosei Co., Ltd.) was coated on one surface of a polyester film having a thickness of 4.8 µm, and a thermal transfer ink layer was coated to a thickness of 4 µm on the other surface of the polyester film by hot-melt coating, thereby producing a thermal transfer ribbon. The thermal transfer ink had a melting point of 72° C.

The thermal transfer ink was composed of 15 parts by weight of Ceast SO (carbon black manufactured by Tokai Carbon Co., Led.), 3 parts by weight of KC-10 (a copolymer of ethylene and vinyl acetate manufactured by Sumitomo Chemical Co., Ltd.), 25 parts by weight of a carnauba wax (manufactured by K.K. Noda Wax, m.p. 85° C.), and 57 parts by weight of HNP-10 (a paraffin wax manufactured by Nippon Seiro Co., Ltd., m.p. 75° C.).

A process of transferring a sensor mark from a sensor mark transfer ribbon to a thermal transfer ribbon according to the present invention will be described below.

Figure 3:
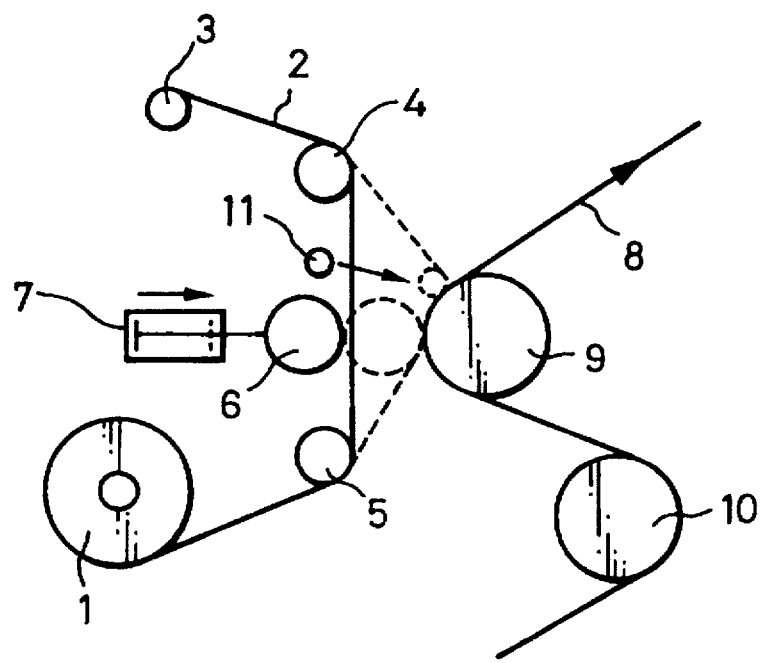
FIG. 3 is a schematic view illustrative of a method of transferring a sensor mark from a sensor mark transfer ribbon to a thermal transfer ribbon according to an embodiment of the present invention.
Figure 4:
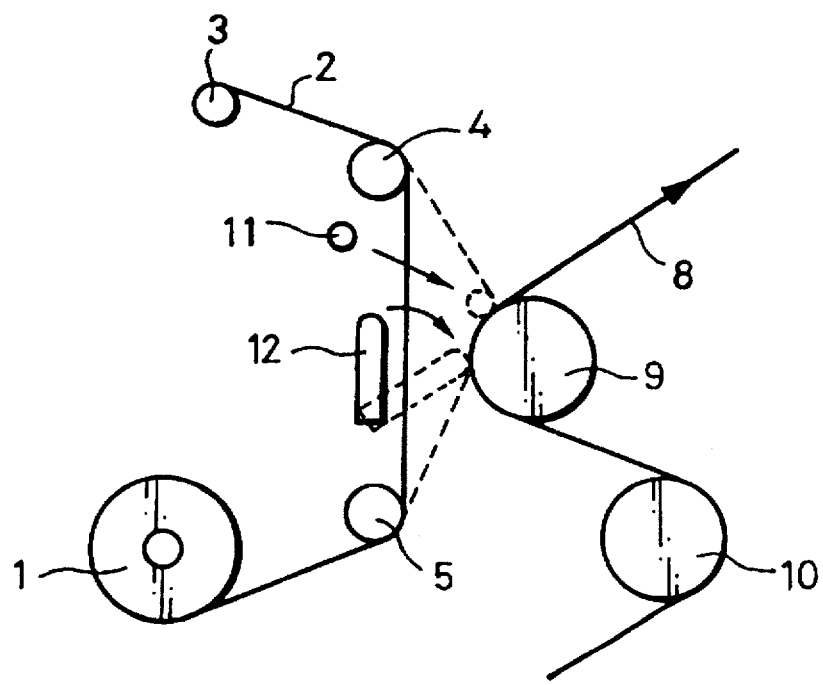
FIG. 4 is a schematic view illustrative of a method of transferring a sensor mark from a sensor mark transfer ribbon to a thermal transfer ribbon according to another embodiment of the present invention.

As shown in FIG. 3, a sensor mark transfer ribbon 2 is unwound from a sensor mark transfer ribbon coil 1 and supplied to a sensor mark transfer ribbon takeup reel 3. Specifically, the sensor mark transfer ribbon 2 from the sensor mark transfer ribbon coil 1 is adjusted to a tension-free condition by a pair of rollers 4, 5. Then, the sensor mark transfer ribbon 2 is displaced toward a confronting pressing roller 9 by an actuator 7 which has a heating roll 6 heated to 90° C. which is held in contact with the base of the sensor mark transfer ribbon 2. A thermal transfer ribbon 8 is trained around a roller 10 and the pressing roller 9 which is held in contact with the base of the thermal transfer ribbon 8. The actuator 7 displaces the sensor mark transfer ribbon 2 until the sensor mark transfer ribbon 2 and the thermal transfer ribbon 8 are gripped between the heating roll 6 and the pressing roller 9. When the sensor mark transfer ribbon 2 and the thermal transfer ribbon 8 are gripped between the heating roll 6 and the pressing roller 9, a sensor mark is transferred from the sensor mark transfer ribbon 2 to the thermal transfer ribbon 8 by the heat applied by the heating roll 6.

The sensor mark pressed against the thermal transfer ribbon 8 is cooled as the thermal transfer ribbon 8 travels. Thereafter, a peeling timing adjusting roll 11 is moved toward the pressing roller 9 by a non-illustrated moving mechanism thereby gripping the sensor mark transfer ribbon 2 and the thermal transfer ribbon 8 between the peeling timing adjusting roll 11 and the pressing roller 9, so that the base of the sensor mark transfer ribbon 2 can be peeled off the sensor mark and the sensor mark can reliably be transferred to the thermal transfer ribbon 8.

Alternatively, as shown in FIG. 3, a transfer bar 12 having one end pivotally supported and the other end heated to 90° C. may be used in place of the heating roll 6. When the transfer bar 12 is turned clockwise, it presses the sensor mark transfer ribbon 2 and the thermal transfer ribbon 8 against the pressing roller 9 for thereby transferring a sensor mark from the sensor mark transfer ribbon 2 to the thermal transfer ribbon 8 by the heat applied by the heat applied by the transfer bar 12.

The protective layer of the thermal transfer ribbon 8 serves to prevent the thermal transfer ribbon 8 from sticking to the pressing roller 9 and to allow the thermal transfer ribbon 8 to travel smoothly. With the ink surface of the thermal transfer ribbon 8 being held in contact with the thermal transfer ink layer of the sensor mark transfer ribbon 2 according to each of the Inventive and Comparative Examples, the sensor mark transfer ribbon 2 and the thermal transfer ribbon 8 traveled at a speed of about 5 cm/sec. while being gripped between the heating roll 6 or the transfer bar 12, heated to 90° C., and the pressing roller 9, with the sensor mark transfer ribbon 2 being in sliding contact with the heating roll 6 or the transfer bar 12, thereby transferring a sensor mark from the sensor mark transfer ribbon 2 to the thermal transfer ribbon 8.

The thermal transfer ribbons to which sensor marks were transferred were subjected to various tests. In the first test, the transferred sensor marks on the thermal transfer ribbons were visually checked. Good transferred conditions were marked with "O", and poor transferred conditions were marked with "x" in FIG. 2.

In the second test, the thermal transfer ribbons to which sensor marks were transferred were inspected for blocking resistance at a temperature of 55° C. and a humidity of 80%Rh under a pressure of 2 kg/cm$^2$ for 24 hours. The blocking resistance was visually checked, with good blocking resistance conditions marked with "O" and poor blocking resistance marked with "x" in FIG. 2.

In the third test, the thermal transfer ribbons to which sensor marks were transferred were printed on FUJI XEROX 7020 Telecopier (a facsimile machine manufactured by Fuji Xerox Co., Ltd.), and the transferred sensor marks were checked by a sensor. If the transferred sensor mark was detected by the sensor, it was marked with "O", and if not detected, it was marked with "x" in FIG. 2.

In the fourth test, the printed sensor mark transferred portions of the thermal transfer ribbons were visually checked for print quality. Good print quality conditions were marked with "O", and poor print quality conditions were marked with "x" in FIG. 2.

Using the sensor mark transfer ribbon according to the present invention, it is possible to form an end sensor mark and a position detecting sensor mark easily and efficiently on the ink surface of a thermal transfer ribbon.

Since a thermally meltable ink composed of a thermally meltable material and a coloring material is coated on a base, a sensor mark of thermally meltable ink can easily be transferred with heat to the thermal transfer ribbon.

The thermally meltable ink for transferring a sensor mark has a melting temperature ranging from 65° C. to 75° C., and a melting viscosity of 16 cst or less. Therefore, the sensor mark of thermally meltable ink can easily be transferred to the thermal transfer ribbon when heated.

In the sensor mark transfer process, the ink surface of the sensor mark transfer ribbon is kept tension-free in confronting relation to the ink surface of the thermal transfer ribbon, and then the sensor mark transfer ribbon and the thermal transfer ribbon are gripped, with their ink surfaces facing each other, between the heating roll or transfer bar and the pressing roller, during which time a sensor mark is transferred from the sensor mark transfer ribbon to the thermal transfer ribbon with heat. Consequently, the sensor mark can easily be formed on the ink surface of the thermal transfer ribbon.

After the sensor mark pressed against to the thermal transfer ribbon is cooled, the base of the sensor mark transfer ribbon is peeled off the sensor mark by peeling timing adjusting roll, and thus transferred to the thermal transfer ribbon. Therefore, the sensor mark can reliably be formed on the ink surface of the thermal transfer ribbon.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A sensor mark transfer ribbon consisting of: a base having a sensor mark ink layer disposed thereon, said sensor mark ink layer consisting of a wax selected from the group consisting of vegetable waxes, animal waxes, petroleum waxes and synthetic waxes, said wax having a melting temperature of from 65° C. to 75° C. and having a melt viscosity at 100° C. of 16 cst or less and a coloring material selected from fine metal powders or inorganic white pigments.

2. A sensor mark transfer ribbon as defined in claim 1, wherein the wax is paraffin wax.

3. A sensor mark transfer ribbon as defined in claim 1, wherein the wax is lanolin wax.

4. A sensor mark transfer ribbon as defined in claim 1, wherein the coloring material is aluminum paste.

5. A sensor mark transfer ribbon as defined in claim 1, wherein the base comprises a polyester film.

\* \* \* \* \*